United States Patent
Funcke et al.

(10) Patent No.: US 6,295,501 B1
(45) Date of Patent: Sep. 25, 2001

(54) METHOD AND ARRANGEMENT FOR CONTROLLING A DRIVE UNIT

(75) Inventors: Guido Funcke, Möglingen; Torsten Bauer, Vaihingen; Winfried Langer, Markqröningen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/385,424

(22) Filed: Aug. 30, 1999

(30) Foreign Application Priority Data

Sep. 16, 1998 (DE) .............................................. 198 42 374

(51) Int. Cl.$^7$ ....................................................... G01D 1/12
(52) U.S. Cl. ............................................. 701/110; 701/103
(58) Field of Search ..................................... 701/101, 102, 701/103, 104, 110, 115; 73/117.3, 118.1, 118.2; 123/339.14, 361, 399

(56) References Cited

U.S. PATENT DOCUMENTS

| | | | |
|---|---|---|---|
| 5,229,957 | 7/1993 | Hahn et al. | 702/94 |
| 5,521,825 * | 5/1996 | Unuvar et al. | 701/103 |
| 5,581,465 * | 12/1996 | Adler et al. | 701/110 |
| 5,692,472 | 12/1997 | Bederna et al. | 123/350 |
| 5,774,820 * | 6/1998 | Linden | 701/110 |
| 6,044,318 * | 3/2000 | Bourdon et al. | 701/110 |
| 6,102,002 * | 8/2000 | Gimmler et al. | 701/110 |

* cited by examiner

*Primary Examiner*—Willis R. Wolfe
(74) *Attorney, Agent, or Firm*—Walter Ottesen

(57) ABSTRACT

The invention is directed to a method and an arrangement for controlling a drive unit wherein at least one measurement signal quantity (U1) is detected. This measurement signal quantity (U1) has at least one end value and the control of the drive unit is undertaken in dependence thereon. Furthermore, a calibration value for this measurement quantity is pregiven and the measurement quantity is converted into a relative measurement quantity (wped) in dependence upon the calibration value. Several measurement signal quantity ranges are pregiven and that range is determined to which the end value of the measurement signal quantity is assigned. The calibration then takes place on the basis of a base value assigned to this region.

10 Claims, 4 Drawing Sheets

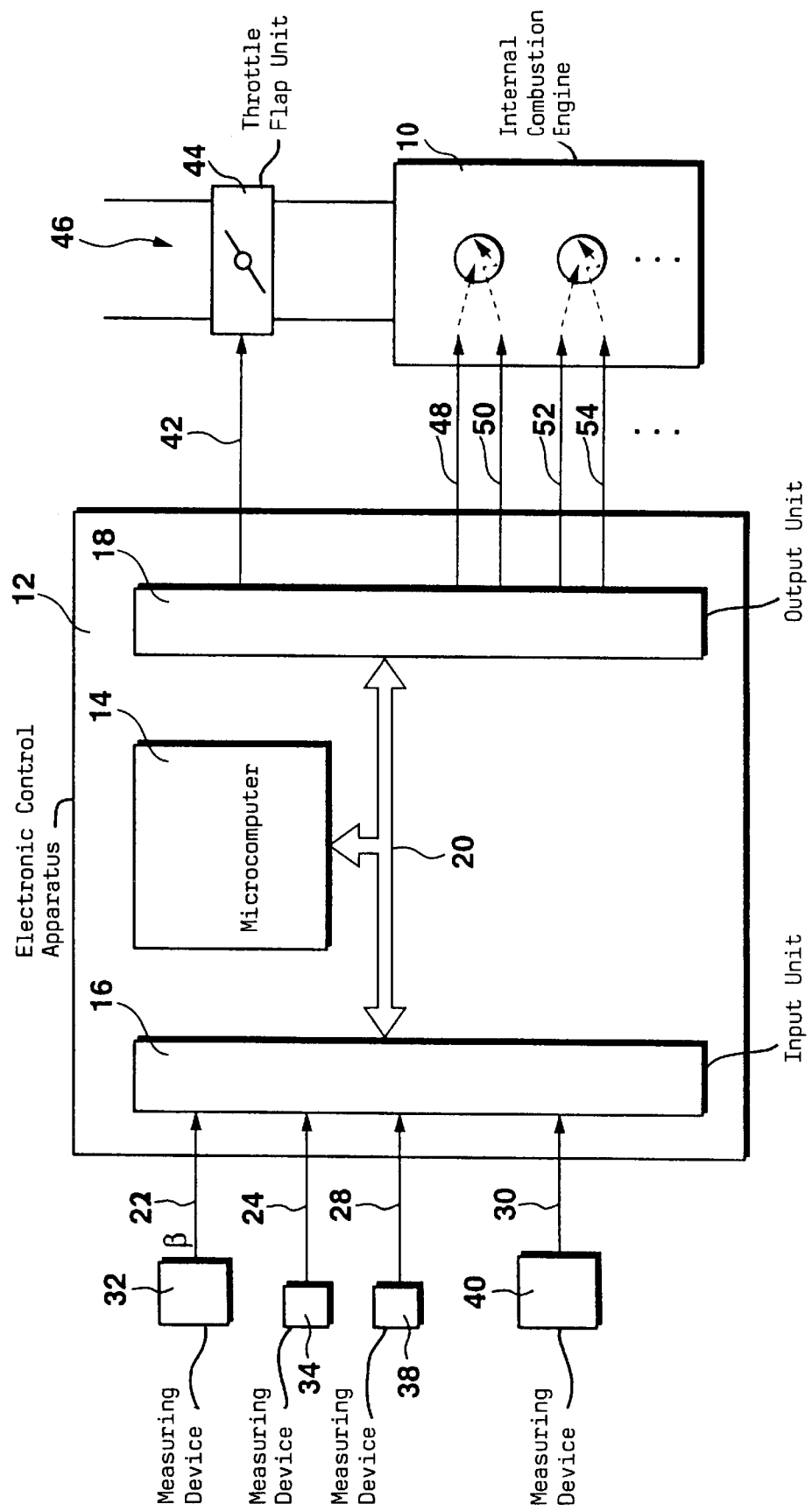

METHOD AND ARRANGEMENT FOR CONTROLLING A DRIVE UNIT

BACKGROUND OF THE INVENTION

U.S. Pat. No. 5,692,472 discloses a method and an arrangement for controlling a drive unit. Here, to control the drive unit, the torque or the power of the drive unit is adjusted via an electrical path at least in dependence upon the position of a operator-controlled element actuable by the driver. To monitor this control, a maximum permissible torque or a maximum permissible power is determined on the basis of the position of the operator-controlled element. The actual torque should not exceed the maximum permissible torque and the actual power of the drive unit should not exceed the maximum permissible power. In some applications, for example, in internal combustion engines having gasoline direct injection systems or for diesel engines, it can be provided that this monitoring is only active when the idle state of the drive unit is detected via the position of the accelerator pedal. The idle state of the drive unit is, as a rule, detected in that at least one signal quantity, which represents the position of the actuable operator-controlled element, is compared to a threshold value and a drop below this threshold value represents a released accelerator pedal and therefore the idle state of the drive unit. For these reasons, there are cases of application wherein a reliable idle detection has special significance.

However, this is not always guaranteed only with the comparison to a fixed pregiven threshold value. For example, because of external influences, such as mechanical faults or a foot mat lying on the pedal, idle detection can no longer be possible so that unwanted operating situations are possible via so-called secondary faults in the described application examples.

U.S. Pat. No. 5,229,957 discloses that the mechanical stops of a position transducer, which detects the position of an accelerator pedal, can be learned, that is, can be adapted to changes. This takes place in that the actual end value of the position signal is stored and is substituted by a new position signal value when the actually measured position signal value exceeds or drops below the stored signal position value. In order to prevent that a defectively learned value leads to a continuously defective shift of the position signal, it is provided that, when for a predetermined time at least one of the stored end values is no longer reached, these end values are reset to pregiven start values. On the basis of the at least one stored end value, the actual position signal of the position transducer is determined while considering the measured voltage signal and a pregiven calibration procedure. The actual position signal is then evaluated for controlling the drive unit.

SUMMARY OF THE INVENTION

It is an object of the invention to provide measures in a control system of this kind for a drive unit with the aid of which a reliable idle detection is possible even in unfavorable cases.

The method of the invention is for controlling a drive unit for which at least one measurement signal quantity (U1) having at least one end value is detected with the drive unit being controlled in dependence upon the end value. The method includes the steps of: presetting several signal quantity regions (I to V) for the end value of the measurement signal quantity (U1) with the signal quantity regions (I to V) being assigned respective calibration values (UPWGRES, UPWGUR, UPWGERS, UPWGNOT); determining the one of the signal quantity regions (I to V) which the end value of the measurement signal quantity (U1) has reached; selecting the calibration value assigned to the one signal quantity region; and, converting the measurement signal quantity (U1) into a relative measurement quantity (wped) on the basis of the selected calibration value.

The solution provided by the invention permits a reliable detection of idle in that a position transducer (accelerator pedal value transducer) is monitored to detect the actuation of an accelerator pedal so that even for an unwanted operating state, the idle detection is reliably ensured at the latest in the next-following driving cycle. A reliable detection of idle is ensured in an especially advantageous manner notwithstanding the above-described fault situations.

It is especially advantageous that a possible accelerator pedal inactive path (a pedal inactive path or lost motion which, as a rule, is an unpleasant sensation for the driver) is only significantly increased when a serious fault is present at an accelerator pedal value transducer.

Under specific conditions, which permit a conclusion to be drawn as to a fault in the accelerator pedal value transducer, idle can be reliably detected by the selection of another calibration procedure. It is especially advantageous in this context that the calibration can be changed (that is, reset) when a correct operation of the accelerator pedal value transducer was detected.

It is especially advantageous that the influence of transition resistances (varying resistance between slider and resistor of potentiometer because of wear) is precluded when utilizing potentiometers to detect the accelerator pedal position.

Even a mat lying on the accelerator pedal no longer presents a problem and cannot lead to unwanted operating states. In the best case, an immediate reset to the standard calibration takes place in such a fault situation.

It is especially advantageous that the return to a standard calibration is also possible during the actual driving cycle. This prevents a motor start or start attempt with an actuated accelerator pedal to lead to an increased pedal inactive path (lost motion path wherein there is no response).

BRIEF DESCRIPTION OF THE DRAWINGS

The invention will now be explained with reference to the drawings wherein:

FIG. 1 shows an overview block circuit diagram of a control arrangement for an internal combustion engine;

DESCRIPTION OF THE PREFERRED EMBODIMENTS OF THE INVENTION

Figure 2B:
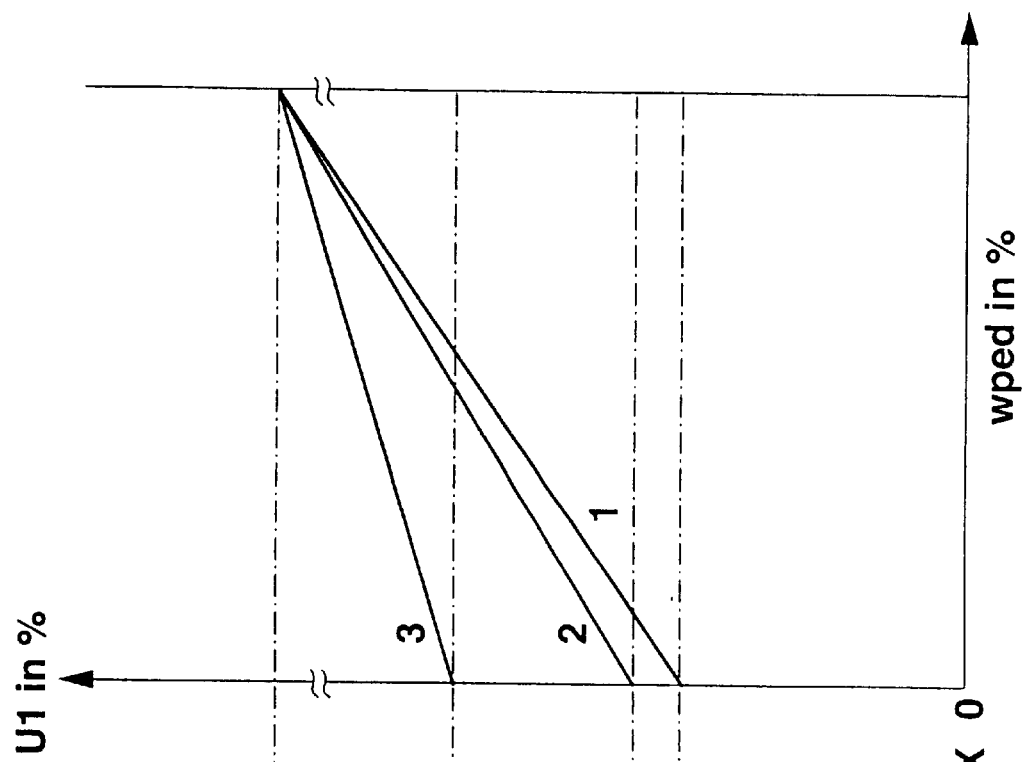
FIG. 2b is a graph showing the guide signal value U1 plotted as a function of the relative pedal value (wped)

A control arrangement for a multi-cylinder combustion engine 10 is shown in FIG. 1. The control arrangement includes an electronic control apparatus 12 which comprises at least one microcomputer 14, an input unit 16 and an output unit 18. These components are coupled to each other via a communications bus 20 for mutual data exchange.

The input lines 22, 24, 28 and 30 are connected to the input unit 16. The line 22 extends from a measuring device 32 for detecting the position of the accelerator pedal and line 24 is from a second measuring device 34 which likewise detects the position of the accelerator pedal. Lines 28 to 30 connect to measuring devices 38 to 40 which detect further operating variables of the drive unit and/or of the vehicle and are evaluated for controlling the drive unit. These additional operating variables include the engine rpm, air mass, et cetera. An output line 42 is connected to output unit 18. The power of the drive unit is controlled via the line 42, for example, by an electrically actuable throttle flap 44 which is mounted in the air intake system 46 of the engine. For the example of the engine, output lines 48, 50, 52, 54, et cetera are provided which are connected to actuators for metering fuel into the cylinders of the engine 10 and/or for adjusting the ignition angle in each cylinder.

The drive unit can, for example, be an internal combustion engine, an electric motor, et cetera. To control this drive unit, the driver command is detected via the two measurement signals U1 and U2 which represent the position. In dependence upon the first measurement signal U1, a desired value for the torque of the drive unit is determined while considering other variables, as needed, such as the engine rpm. This desired value is then converted into control signals for adjusting the torque of the drive unit while considering the actual torque as may be required. For an internal combustion engine, the control signals are for adjusting the air supply, the fuel metering and/or the ignition angle. Various measures are provided for fault monitoring with respect to the detection of measurement signals at the accelerator pedal. These measures are, for example, a comparison of the measurement signal U1 of the first measuring device to the signal U2 of the second measuring device with respect to plausibility. If the measurement signals distinguish from each other by more than a pregiven tolerance, then a fault in the area of the measurement value detection is assumed and an emergency operation of the control is initiated.

For idle of the drive unit, specific measures are taken, for example, an idle control is activated or, in some embodiments, a monitoring mechanism is carried out on the basis of actual and permissible torque values. For this reason, it is important to reliably detect the idle state. This takes place, in general, by monitoring the position of the accelerator pedal. An idle state can be assumed when the driver has released the accelerator pedal. This is detected in that at least one of the position signals (preferably, the position signal of the first measuring device U1) is compared to a limit value below which it can be assumed that the accelerator pedal has been released.

If the pedal value transducer, however, does not reach this idle position even for a released accelerator pedal because of external influences, then the idle state cannot be detected with the above-described means and the desired operation of the drive unit cannot be ensured.

Such external faults can, for example, be mechanical faults in the area of the pedal value transducer or a foot mat which lies on the pedal. In this case, no idle detection takes place. In the following, a diagnostic possibility is described which monitors the pedal value transducer in such a manner that, at the latest after one driving cycle, a reliable detection of idle is again possible. In this way, the complete operability of the drive unit control is again ensured.

The two independent voltage values U1 and U2 of the pedal value transducer are converted in the control unit into a relative pedal value wped between 0% and 100%. For the procedure described below, it is assumed that the idle detection takes place in the microcomputer of the control unit via this relative pedal value wped.

Idle is detected when the guide signal U1 moves to wped=0%. A calibration procedure is performed for the conversion of the voltage value U1 into the relative pedal value wped. In this calibration procedure, all values of U1 below or equal to a lower threshold value UPWGUR are assigned the value wped=0%. The idle detection therefore takes place when the voltage signal U1 lies below this threshold value.

Figure 2A:
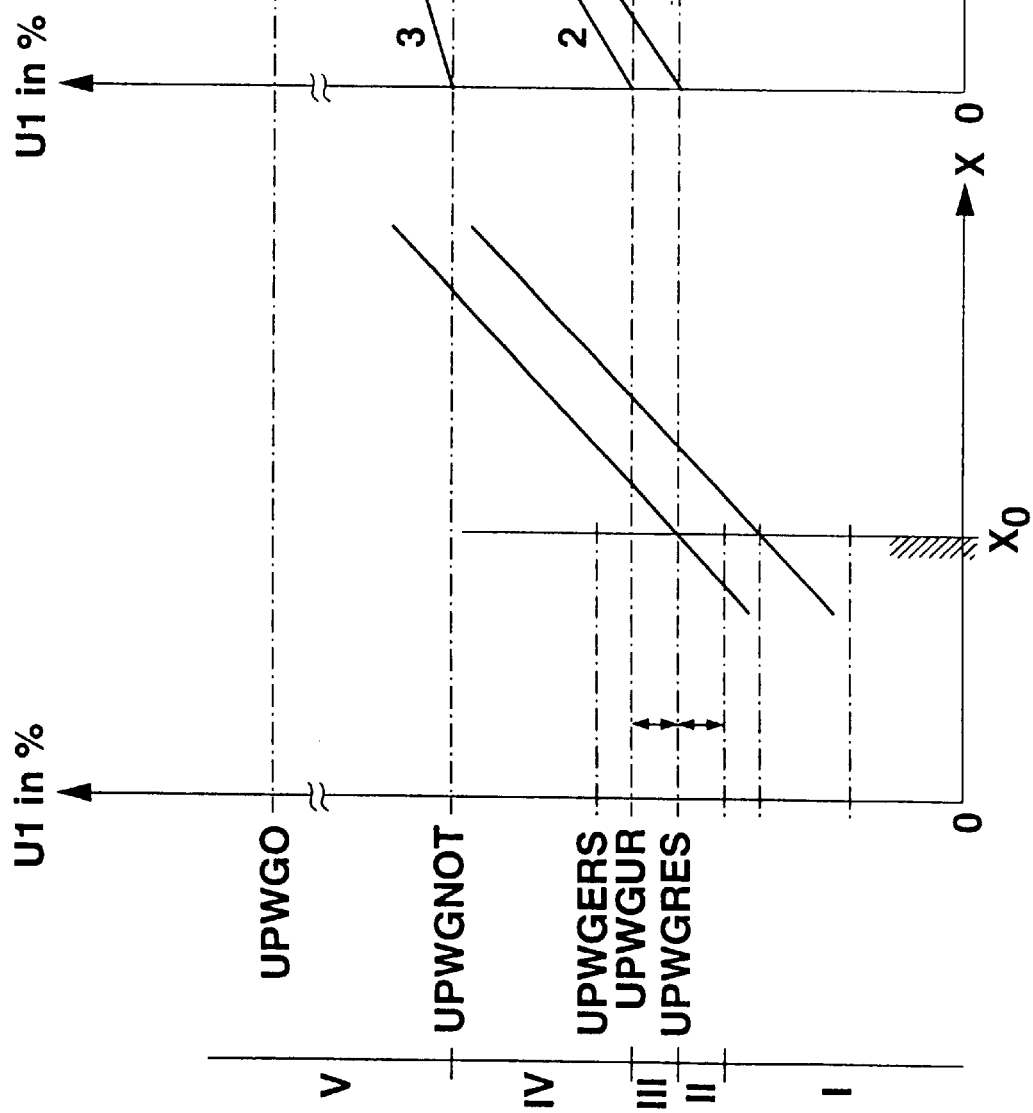
FIG. 2a shows the guide signal U1 plotted as a function of the actual deflection (x) of the accelerator pedal.

The solution of the invention is shown in FIGS. 2a and 2b for the example of the guide signal value U1.

In FIG. 2a, the voltage value U1 on the vertical axis is plotted against the actual deflection x of the accelerator pedal on the horizontal axis; whereas, in FIG. 2b, the signal value U1 on the vertical axis is plotted against the relative accelerator pedal value wped on the horizontal axis. The actual mechanical idle position of the accelerator pedal could be $x_o$.

The straight lines plotted in FIG. 2a identify the tolerance region of the voltage signal U1. A calibration is carried out in the conversion of the voltage signal U1 into the relative pedal value and this calibration leads to a calibration line 1. According to this calibration, each value, which lies below the value UPWGUR, is assigned the value 0%. Each measured voltage U1 is referred to this limit value (for example via subtraction) as a base value and is converted into the relative pedal value so that, in the normal case, a characteristic in accordance with calibration line 1 in FIG. 2b results.

The voltage signal U2, which is not shown in FIGS. 2a and 2b, serves to monitor the guide signal U1 as shown above and is likewise correspondingly converted.

First, the premise is taken that the pedal value transducer operates correctly, that is, that the signal U1 lies within the tolerance band which is shown in FIG. 2a.

According to the invention, the minimal voltage value U1 is determined which the guide signal has reached during a driving cycle, that is, between a start of the drive unit and a switchoff thereof. This minimal value characterizes the guide signal. In the preferred embodiment, the signal range of the guide signal U1 is subdivided into five sections I to V as shown in FIG. 2a along the axis drawn parallel to the ordinate for the guide signal U1. In the actual driving cycle, a check is made as to in which voltage range the minimum signal value U1 lands. This information as to the minimum voltage region reached in the actual driving cycle is stored. With this, the following cases can be distinguished.

If the guide signal U1 reaches section I or II below the threshold value UPWGUR, then the pedal value transducer is normal. Proceeding from a standard calibration with the value UPWGUR as a base value, the idle position is detected at least once in the actual driving cycle. The next driving cycle can therefore be operated with the calibration procedure unchanged.

If the guide signal U1 as a minimum value reaches only the section III between the voltage thresholds UPWGUR and UPWGERS (for example because of a mechanical fault), then no idle would be detected in the actual driving cycle. In the next driving cycle, a switchover is made to the substitute calibration procedure (shown here as characteristic line 2). The base value of this substitute calibration procedure is UPWGERS. In this way, an idle can be reliably detected in the new driving cycle notwithstanding the existing fault pattern. Furthermore, the pedal idle path is not increased for a suitable selection of the threshold value UPWGERS because the guide signal U1 never lies at values below UPWGUR because of the fault. A return to the standard calibration is only permitted when the guide signal U1 drops into the voltage range I.

It is not enough to reach only range II. The voltage ranges are selected in such a manner that, especially for potentiometer systems, a defective reset calibration based on transition resistances is avoided. If the preconditions for the reset calibration are given, then this can take place immediately. One does not have to wait for the next driving cycle. For a suitable selection of the voltage ranges I to III, the maximum possible idle path always lies in the same tolerance region as is also possible in the normal case.

If the guide signal U1 as minimum value only reaches the section IV between the voltage thresholds UPWGERS and UPWGNOT (for example because of a mechanical fault or because of the influence of a foot mat), no idle is detected in the actual driving cycle. Therefore, in the next driving cycle, there is a switchover to the emergency calibration 3 with the value UPWGNOT as a base value. In this way, idle can again be reliably detected notwithstanding the existing fault pattern. An increased inactive path can occur in dependence upon the value UPWGNOT in the case of a fault. Here too, a return to the normal scale 1 and/or to the substitute scale 2 is only possible when the guide signal U1 drops into the voltage ranges I or II, respectively. It is not sufficient to reach range III. In this way, it is, in turn, avoided that an incorrect scaling reset takes place based on transition resistances especially in potentiometer systems. If the preconditions for the scaling reset are given, then this can take place immediately.

If the guide signal U1 reaches only section V above the voltage threshold UPWGNOT as a minimum value (for example, because of a mechanical fault or because of the influence of a foot mat), no idle is detected in the actual driving cycle. A switchover to the emergency calibration 3 in the next driving cycle is, however, not adequate for a reliable idle detection in this case because the guide signal U1 does not drop below the threshold value UPWGNOT when the fault continues to be present. Accordingly, a direct idle input with the actuation of the brake also takes place in addition to the switchover to the emergency calibration 3. In this way, it is ensured that the driver can still reliably force the idle position. Notwithstanding the difficult fault pattern in the area of the pedal value transducer, an optimal availability of the vehicle is ensured while simultaneously maintaining highest safety. The above-described method is applied for the return to substitute calibration 2 or to the normal calibration 1. The threshold value UPWGNOT is to be so selected that an optimal compromise is given between drivability and fault reaction.

In the above-described preferred embodiment, the pedal scaling is switched between three different curves. In another advantageous embodiment, a desired number of calibration curves is present. In this way, a reduction of the pedal inactive path is reached in the case of a fault. Here, it must be ensured that a canceling of the calibration only takes place when the influence of short-term electrical disturbances (for example because of transition resistances) is clearly precluded. For this purpose, the different calibration curves must be at a minimum distance to each other.

A computer program is utilized in a preferred realization of the above-described solution according to the invention. This computer program runs in the microcomputer of the control unit and is outlined in the flowcharts of FIGS. 3 and 4.

Figure 3:
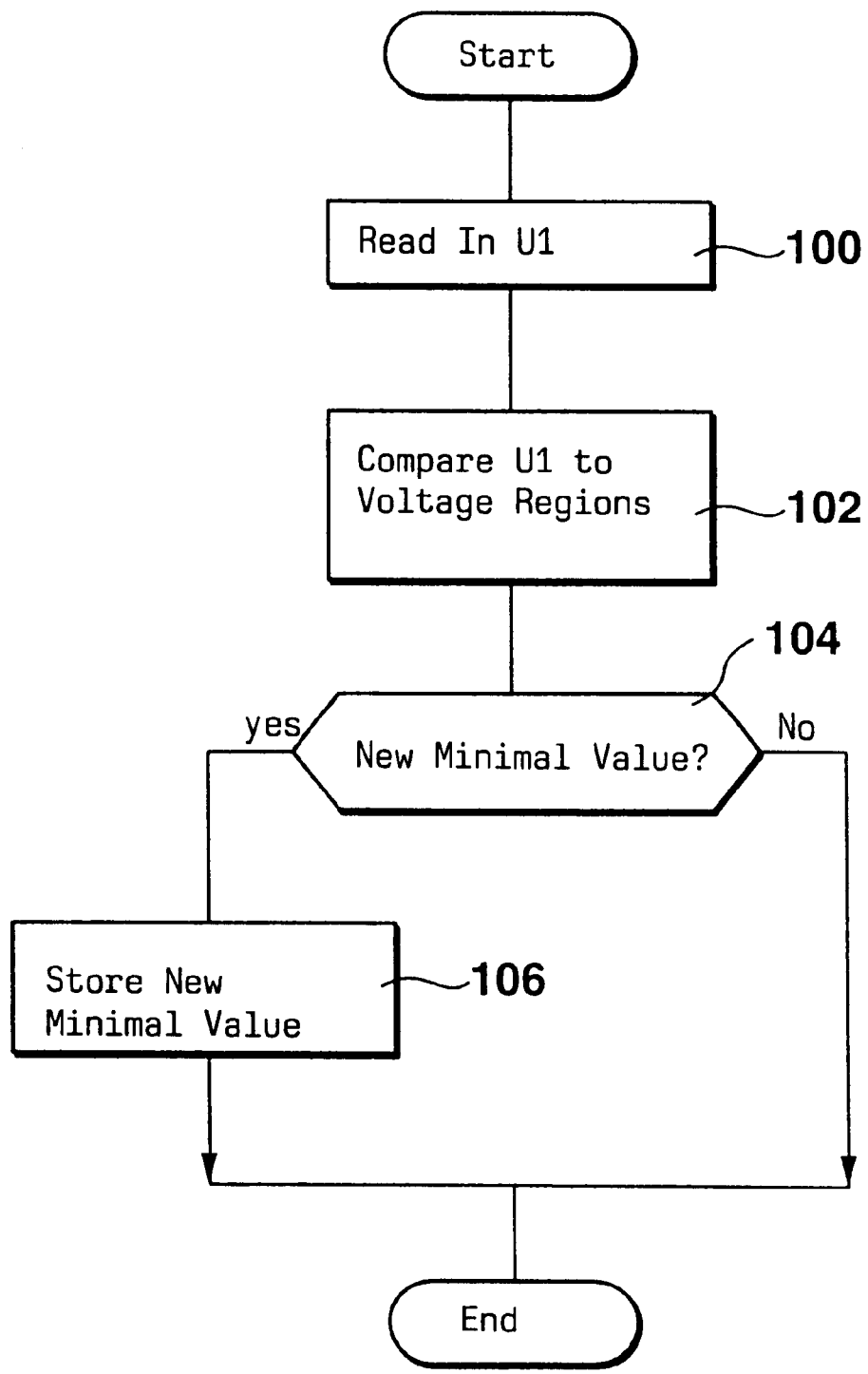
FIG. 3 is a flowchart showing a preferred realization of the method of the invention as a computer program; and, FIG. 4 is a flowchart showing another embodiment of the method of the invention as a computer program.

The program outlined in FIG. 3 describes the storage of the minimum voltage range of the signal U1 which is reached in a driving cycle. The program is started at pregiven time points, for example, every five ms. In the first step 100, the signal value U1 is read in. This signal value U1 is compared to the limit values of the voltage ranges 1 and 5 in step 102. Thereupon, in step 104, a check is made as to whether a new minimum voltage range has been detected. If this is the case, the actual voltage range is stored as a new minimum value in step 106 and the program is ended in step 104 as in the case of a negative answer.

The program outlined in FIG. 3 therefore ensures that the determined minimum voltage range is always stored in a driving cycle. At the start of a driving cycle, the memory is reset for the minimum value to the range V.

Figure 4:
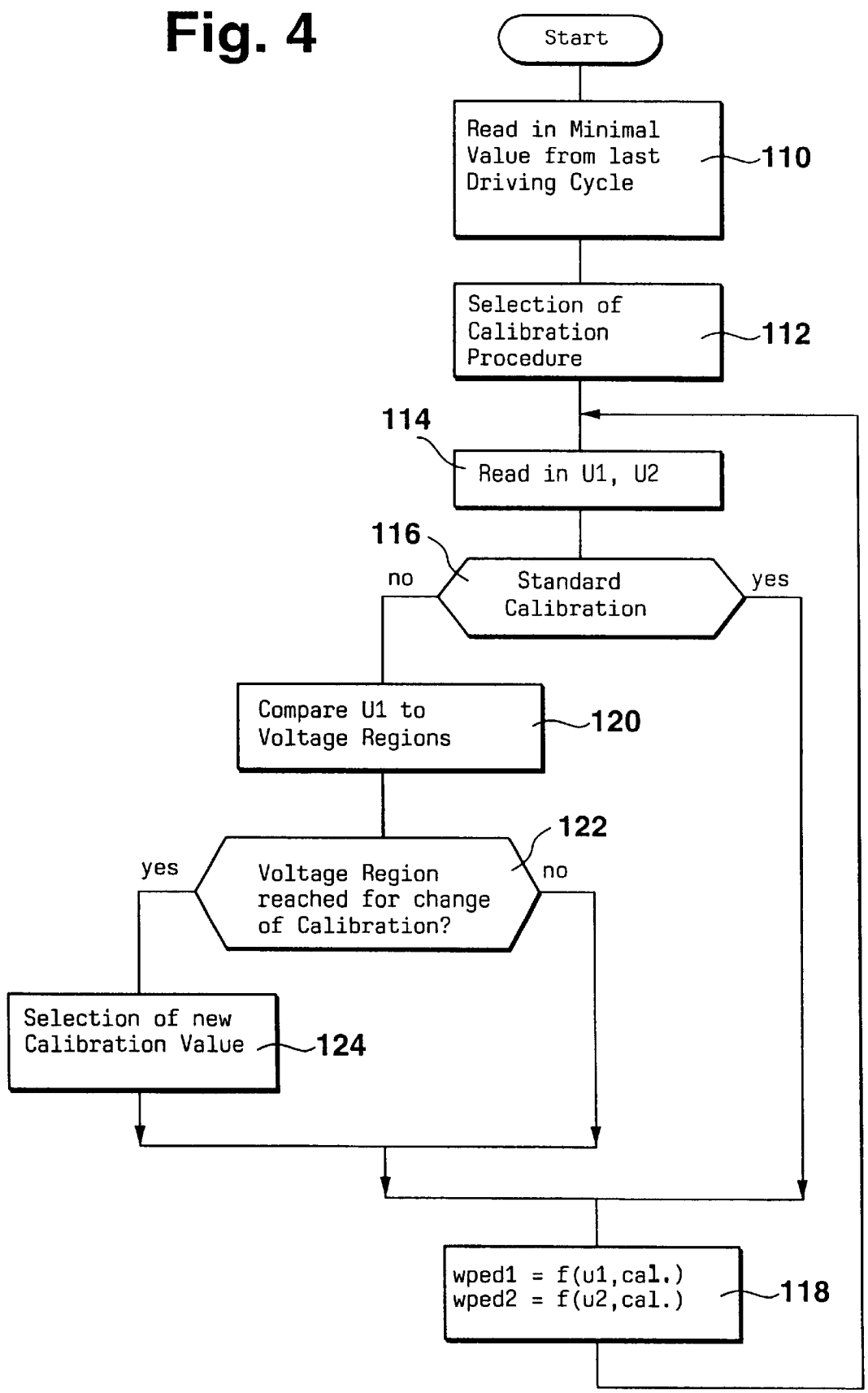

In the flowchart of FIG. 4, the calibration is outlined in dependence upon the determined minimum voltage range of the previous driving cycle. This program too is initiated at pregiven time points. In step 110, the minimum voltage range is read in which was reached in the previous driving cycle. Thereupon, in step 112, the calibration procedure is selected as shown above, that is, the limit value is pregiven which is the basis of the calibration. In the next step 114, the signal values U1 and U2 are read in. Thereupon, in step 116, a check is made as to whether the standard calibration 1 has been selected. If this is the case, then the relative pedal values wped 1 and wped 2 are computed in accordance with step 118 on the basis of the standard calibration value and on the basis of the signals U1 and/or U2. Thereafter, the program is repeated with step 114. If no standard calibration is present in accordance with step 116, then the measured signal value U1 is compared to the limit values of the voltage ranges in step 120. In the next step 122, a determination based on the comparison in step 120 is made as to whether the voltage range 1 or 2 has been reached. If this is the case, then a new calibration value is selected in step 124 in accordance with the above-described strategy and the program, as in the case of the negative answer in step 122, is continued with step 118 and the actually present calibration.

A corresponding procedure is also applied in combination with other sensor signals with the advantages presented above. For example, the procedure can be applied with a throttle flap position signal wherein important data can be derived from attaining an end position.

It is understood that the foregoing description is that of the preferred embodiments of the invention and that various changes and modifications may be made thereto without departing from the spirit and scope of the invention as defined in the appended claims.

What is claimed is:

1. A method for controlling a drive unit, the method comprising the steps of:

detecting at least one measurement signal quantity (U1) having at least one extreme value and determining said extreme value with said drive unit being controlled in dependence upon said extreme value;

presetting several signal quantity regions (I to V) for said extreme value of said measurement signal quantity (U1) with said signal quantity regions (I to V) being assigned respective calibration values (UPWGRES, UPWGUR, UPWGERS, UPWGNOT, UPWGO);

determining the one of said signal quantity regions (I to V) which said extreme value of said measurement signal quantity (U1) has reached;

selecting the calibration value assigned to said one signal quantity region in dependence upon said extreme value; and, converting said measurement signal quantity (U1) into a relative measurement quantity (wped) on the basis of the selected calibration value.

2. The method of claim 1, wherein said measurement signal quantity represents the position of an accelerator pedal.

3. The method of claim 2, wherein said extreme value is reached in a predetermined time and said predetermined time is one driving cycle.

4. A method for controlling a drive unit for which at least one measurement signal quantity (U1) having at least one end value is detected with said drive unit being controlled in dependence upon said end value, the method comprising the steps of:

presetting several signal quantity regions (I to V) for said end value of said measurement signal quantity (U1) with said signal quantity regions (I to V) being assigned respective calibration values (UPWGRES, UPWGUR, UPWGERS, UPWGNOT, UPWGO);

determining the one of said signal quantity regions (I to V) which said end value of said measurement signal quantity (U1) has reached;

selecting the calibration value assigned to said one signal quantity region;

converting said measurement signal quantity (U1) into a relative measurement quantity (wped) on the basis of the selected calibration value; and, when in a new driving cycle, a measurement signal quantity region is reached in the area of the old calibration quantity, immediately resetting the calibration quantity to this calibration quantity.

5. A method for controlling a drive unit for which at least one measurement signal quantity (U1) having at least one end value is detected with said drive unit being controlled in dependence upon said end value, the method comprising the steps of:

presetting several signal quantity regions (I to V) for said end value of said measurement signal quantity (U1) with said signal quantity regions (I to V) being assigned respective calibration values (UPWGRES, UPWGUR, UPWGERS, UPWGNOT, UPWGO);

determining the one of said signal quantity regions (I to V) which said end value of said measurement signal quantity (U1) has reached;

selecting the calibration value assigned to said one signal quantity region;

converting said measurement signal quantity (U1) into a relative measurement quantity (wped) on the basis of the selected calibration value; and, providing a standard calibration quantity and utilizing said standard calibration quantity when, in the last driving cycle, the measurement signal quantity has reached a region below said calibration quantity.

6. A method for controlling a drive unit for which at least one measurement signal quantity (U1) having at least one end value is detected with said drive unit being controlled in dependence upon said end value, the method comprising the steps of:

presetting several signal quantity regions (I to V) for said end value of said measurement signal quantity (U1) with said signal quantity regions (I to V) being assigned respective calibration values (UPWGRES, UPWGUR, UPWGERS, UPWGNOT, UPWGO);

determining the one of said signal quantity regions (I to V) which said end value of said measurement signal quantity (U1) has reached;

selecting the calibration value assigned to said one signal quantity region;

converting said measurement signal quantity (U1) into a relative measurement quantity (wped) on the basis of the selected calibration value; and, presetting a substitute calibration quantity which is greater than the standard calibration quantity; and, said substitute calibration quantity forming the basis of said calibration when, in the last driving cycle, said measurement signal quantity has reached a region which lies between the standard calibration quantity and the substitute calibration quantity.

7. A method for controlling a drive unit for which at least one measurement signal quantity (U1) having at least one end value is detected with said drive unit being controlled in dependence upon said end value, the method comprising the steps of:

presetting several signal quantity regions (I to V) for said end value of said measurement signal quantity (U1) with said signal quantity regions (I to V) being assigned respective calibration values (UPWGRES, UPWGUR, UPWGERS, UPWGNOT, UPWGO);

determining the one of said signal quantity regions (I to V) which said end value of said measurement signal quantity (U1) has reached;

selecting the calibration value assigned to said one signal quantity region;

converting said measurement signal quantity (U1) into a relative measurement quantity (wped) on the basis of the selected calibration value; and, presetting an emergency calibration quantity which is greater than the substitute calibration quantity and which forms the basis of the calibration when, in the last driving cycle, the measuring signal quantity has reached a region between the substitute calibration quantity and the emergency calibration quantity.

8. A method for controlling a drive unit for which at least one measurement signal quantity (U1) having at least one end value is detected with said drive unit being controlled in dependence upon said end value, the method comprising the steps of:

presetting several signal quantity regions (I to V) for said end value of said measurement signal quantity (U1) with said signal quantity regions (I to V) being assigned respective calibration values (UPWGRES, UPWGUR, UPWGERS, UPWGNOT, UPWGO);

determining the one of said signal quantity regions (I to V) which said end value of said measurement signal quantity (U1) has reached;

selecting the calibration value assigned to said one signal quantity region;

converting said measurement signal quantity (U1) into a relative measurement quantity (wped) on the basis of the selected calibration value; and, outputting the idle data when the brake is activated and, in the last driving cycle, the measurement signal quantity has not become less than the emergency calibration quantity.

9. A method for controlling a drive unit for which at least one measurement signal quantity (U1) having at least one end value is detected with said drive unit being controlled in dependence upon said end value, the method comprising the steps of:

presetting several signal quantity regions (I to V) for said end value of said measurement signal quantity (U1)

with said signal quantity regions (I to V) being assigned respective calibration values (UPWGRES, UPWGUR, UPWGERS, UPWGNOT, UPWGO);

determining the one of said signal quantity regions (I to V) which said end value of said measurement signal quantity (U1) has reached;

selecting the calibration value assigned to said one signal quantity region;

converting said measurement signal quantity (U1) into a relative measurement quantity (wped) on the basis of the selected calibration value; and, detecting the idle state of the drive unit when the measurement signal quantity has reached or dropped below the calibration quantity.

10. An apparatus for controlling a drive unit, the apparatus comprising:

means for detecting at least one measurement signal quantity (U1) having at least one extreme value and for determining said extreme value;

a control unit for controlling said drive unit in dependence upon said extreme value;

means for presetting several signal quantity regions (I to V) for said extreme value of said measurement signal quantity (U1) with said signal quantity regions (I to V) being assigned respective calibration values (UPWGRES, UPWGUR, UPWGERS, UPWGNOT, UPWGO);

means for determining the one of said signal quantity regions (I to V) which said extreme value of said measurement signal quantity (U1) has reached;

means for selecting the calibration value assigned to said one signal quantity region in dependence upon said extreme value; and, means for converting said measurement signal quantity (U1) into a relative measurement quantity (wped) on the basis of the selected calibration value.

* * * * *